(12) United States Patent
Satalkar et al.

(10) Patent No.: US 9,262,515 B2
(45) Date of Patent: Feb. 16, 2016

(54) SOCIAL NETWORK AWARE SEARCH RESULTS WITH SUPPLEMENTAL INFORMATION PRESENTATION

(71) Applicant: Mircosoft Corporation, Redmond, WA (US)

(72) Inventors: Gautam Satalkar, San Jose, CA (US); David Andrew Nelson, Brooklyn, NY (US); Jon Nicolas Myette, Lake Forest Park, WA (US); Gaurang Prajapati, Redmond, WA (US); Peiyu Liu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/674,934

(22) Filed: Nov. 12, 2012

(65) Prior Publication Data

US 2014/0136546 A1 May 15, 2014

(51) Int. Cl.
*G06F 17/30* (2006.01)

(52) U.S. Cl.
CPC .... *G06F 17/30699* (2013.01); *G06F 17/30867* (2013.01)

(58) Field of Classification Search
USPC .......................................... 707/748, 749, 747
See application file for complete search history.

(56) References Cited

U.S. PATENT DOCUMENTS

| | | | |
|---|---|---|---|
| 7,308,457 B1 | 12/2007 | Sundman et al. | |
| 7,890,501 B2 | 2/2011 | Lunt et al. | |
| 8,005,906 B2 | 8/2011 | Hayashi et al. | |
| 8,019,743 B2 | 9/2011 | Ebanks | |
| 8,121,900 B1 | 2/2012 | Gluten et al. | |
| 8,131,779 B2 | 3/2012 | Jonker et al. | |
| 8,799,276 B1 * | 8/2014 | Hyatt et al. | 707/723 |
| 2006/0064410 A1 | 3/2006 | Razza et al. | |
| 2006/0173702 A1 | 8/2006 | Saxena et al. | |
| 2007/0005702 A1 * | 1/2007 | Tokuda et al. | 709/206 |
| 2007/0271272 A1 | 11/2007 | McGuire et al. | |

(Continued)

OTHER PUBLICATIONS

Sterling, Greg., "Snapshot, Sidebar Oh My: Live Blogging the Bing Search Summit", Retrieved at <<http://searchengineland.com/live-blogging-the-bing-search-summit-2-120874>>, May 10, 2012, pp. 7.

(Continued)

*Primary Examiner* — Jay Morrison
(74) *Attorney, Agent, or Firm* — Dave Ream; Tom Wong; Micky Minhas (57) ABSTRACT

A user is provided with both identification of individuals who have authored content responsive to a user's search query and the authored content itself. A user's social network is referenced to identify those individuals to whom the user maintains human connections. Content authored by those individuals is searched and individuals authoring such content are identified, together with the authored content. Additionally, content authored by individuals having unique experiences, perspective, or specialized information is searched to identify responsive content and individuals authoring such content are also identified. An initial identification of responsive individuals comprises a portion of such content and user action directed to an identification of an individual results in additional authored content being presented, thereby enabling the user to recognize the reason for which such an individual was identified in response to the user's search query. Options for establishing interpersonal communications are also provided.

20 Claims, 5 Drawing Sheets

(56) References Cited

U.S. PATENT DOCUMENTS

| | | | |
|---|---|---|---|
| 2008/0133495 A1 | 6/2008 | Fischer | |
| 2009/0030940 A1* | 1/2009 | Brezina et al. | 707/103 Y |
| 2009/0164913 A1 | 6/2009 | Davar et al. | |
| 2009/0164929 A1* | 6/2009 | Chen et al. | 715/769 |
| 2009/0187537 A1* | 7/2009 | Yachin et al. | 707/3 |
| 2009/0234814 A1 | 9/2009 | Boerries et al. | |
| 2009/0249244 A1 | 10/2009 | Robinson et al. | |
| 2009/0282002 A1 | 11/2009 | Reeder et al. | |
| 2009/0307205 A1 | 12/2009 | Churchill et al. | |
| 2010/0115396 A1* | 5/2010 | Byron et al. | 715/234 |
| 2010/0153215 A1 | 6/2010 | Abraham | |
| 2010/0174704 A1 | 7/2010 | Ciravegna et al. | |
| 2011/0208822 A1 | 8/2011 | Rathod | |
| 2011/0320423 A1 | 12/2011 | Gemmell et al. | |
| 2012/0005201 A1* | 1/2012 | Ebanks | 707/728 |
| 2012/0078884 A1* | 3/2012 | Callari et al. | 707/722 |
| 2012/0158715 A1* | 6/2012 | Maghoul et al. | 707/728 |
| 2012/0158720 A1* | 6/2012 | Luan et al. | 707/732 |
| 2012/0246578 A1* | 9/2012 | Baldwin et al. | 715/753 |
| 2012/0278740 A1* | 11/2012 | Robinson et al. | 715/757 |
| 2012/0296974 A1* | 11/2012 | Tabe | 709/204 |
| 2013/0036109 A1* | 2/2013 | Kulick et al. | 707/722 |
| 2013/0036114 A1 | 2/2013 | Wong et al. | |
| 2013/0085844 A1* | 4/2013 | Neystadt et al. | 705/14.49 |
| 2013/0246170 A1* | 9/2013 | Gross et al. | 705/14.49 |
| 2014/0095266 A1 | 4/2014 | Cumby et al. | |
| 2014/0101134 A1 | 4/2014 | Bohrer et al. | |
| 2014/0136504 A1 | 5/2014 | Shum et al. | |
| 2014/0136518 A1 | 5/2014 | Shum et al. | |

OTHER PUBLICATIONS

Connell, et al., "Introducing the New Bing: Spend Less Time Searching, More Time Doing", Retrieved at <<http://www.bing.com/community/site_blogs/b/search/archive/2012/05/10/spend-less-time-searching-more-time-doing-introducing-the-new-bing.aspx>>, May 10, 2012, pp. 3.

Levin, et al., "Bing Announces Social Updates to Search Results", Retrieved at <<http://blog.360i.com/search-marketing/bing-announces-social-updates-to-search-results>>, May 14, 2012, pp. 3.

Darrow, Barb., "Microsoft search guru outlines big Bing changes", Retrieved at <<http://gigaom.com/2012/05/10/microsoft-search-guru-outlines-big-bing-changes/>>, Jul. 11, 2012, pp. 5.

Johnson, Bridget., "The Socialized Search Take Over: Bing•s Social Sidebar Against Google•s Search Plus Your World", Retrieved at <<http://www.iprospect.com/blog/featured/the-socialized-search-take-over-bings-social-sidebar-against-googles-search-plus-your-world.html>>, Jul. 12, 2012, pp. 2.

"New Microsoft Bing design went live and blends great with Windows 8", Retrieved at <<http://pureinfotech.com/2012/06/01/new-microsoft-bing-design-windows-8/>>, Jul. 12, 2012, pp. 4.

Konstas, et al., "On Social Networks and Collaborative Recommendation", Retrieved at <<http://eprints.gla.ac.uk/5985/2/sigirfp468-konstas-Enlighten.pdf>>, SIGIR •09, Jul. 19, 2009, pp. 8.

* cited by examiner

SOCIAL NETWORK AWARE SEARCH RESULTS WITH SUPPLEMENTAL INFORMATION PRESENTATION

BACKGROUND

As network communications among multiple computing devices have become ubiquitous, the quantity of information available via such network communications has increased exponentially. For example, the ubiquitous Internet and World Wide Web comprise information sourced by a vast array of entities throughout the world, including corporations, universities, individuals and the like. Such information is often marked, or "tagged", in such a manner that it can be found, identified and indexed by services known as "search engines". Even information that is not optimized for search engine indexing can still be located by services, associated with search engines, which seek out information available through network communications with other computing devices and enable a search engine to index such information for subsequent retrieval.

Due to the sheer volume of information available to computing devices through network communications with other computing devices, users increasingly turn to search engines to find the information they seek. Search engines typically enable users to search for any topic and receive, from this vast volume of information, identifications of specific content that is deemed to be responsive to, or associated with, the users' queries. To sort through the vast amounts of information that is available, and timely provide useful responses to users' queries, search engines employ a myriad of mechanisms to optimize the identification and retrieval of responsive and associated information.

Unfortunately, even with the aid of search engines, users are often overwhelmed by the sheer volume of information available. For example, typical topics searched for by users often result in millions of results that are identified by search engines. Additionally, certain types of search queries are often not adequately answered by the results returned by search engines. In particular, queries directed to human-based attributes, such as evaluations, opinions, experiences and the like often return search results that may not be what the user was searching for. For example, a query searching for experiences dealing with traffic situations in a particular city during a particular time of day may return search results directed to specific traffic incidents in the past, or a current, or historical, traffic data, but may not provide the sort of guidance a user would have been searching for with such a query.

SUMMARY

In one embodiment, a user's social network can be referenced to identify content that is both responsive to a user's search query and that was authored by individuals in the user's social network. Based on the identification of such content, those individuals from the user's social network that authored such content can be identified and provided in response to the user's search query.

In another embodiment, content authored by other individuals, beyond merely those in a user's social network, can also be searched for content that is responsive to the user's search query. Such other individuals can include individuals having particularized knowledge in specific subject areas, such as professors or researchers, individuals having unique experiences, such as celebrities or politicians, individuals who are influential or well connected, such as business leaders, or other like individuals that are either well-versed in particular subject areas, or are otherwise well known.

In yet another embodiment, in response to a user's search query, one or more individuals can be identified and additional information regarding the content authored by such individuals can also be provided. Such additional information can include an identification of the type of authored content, some or all of the authored content itself, or combinations thereof.

In a further embodiment, user action directed to an identification of an individual in response to the user's search query can provide the user with all, or substantially all, of the content authored by such an individual that caused such an individual to be identified to the user in response to the user's search query. Such content can, thereby, enable the user to recognize why such an individual was identified in response to the user's search query and determine whether the content authored by such an individual is of relevance to the user's search query.

In a still further embodiment, interpersonal communication options can be provided to a user such that, if a user determines that an individual identified in response to the user's search query is relevant to the user's interests, the user can utilize one of such interpersonal communication options to establish interpersonal communications with the individual identified.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following descriptions are directed to mechanisms and interfaces through which a user can be provided with an identification of individuals who have authored content that is responsive to a user's search query, and through which a user can be provided with such authored content so as to themselves determine the relevance of such individuals to the user's interests. A user's social network can be referenced to identify those individuals to whom the user has some human connection, such as "friends" of the user, as such term is typically utilized in a social context. The content authored by those individuals can then be searched to identify content responsive to the user's search query. The individuals authoring such content can be identified to the user, as can the content authored by such individuals that was determined to be relevant to the user's search query. Social network information can also be referenced to identify those individuals having unique experiences, perspective, or specialized information, or individuals who are otherwise influential, such as celebrities, politicians, professors, researchers and the like. The content authored by those individuals can also be searched to identify content responsive to the user's search query and the individuals authoring such content can be identified to the user, in addition to the content itself. The initial identification of responsive individuals can comprise an identification of the type of content, or a portion of such content. Subsequently, should a user direct user action to the identification of an individual, most, or all, of the content authored by such an individual can be presented to the user to enable the user to recognize the reason for which such an individual was identified in response to the user's search query. Additionally, interpersonal communication options can be provided to a user such that, if the user determines that an identified individual is relevant to the user's interests, the user can establish further interpersonal communication with such an individual.

For purposes of illustration, the techniques described herein make reference to existing and known application user interface contexts, such as user interfaces typically presented by Web browsers. Also for purposes of illustration, the techniques described herein make reference to existing and known protocols and languages, such as the ubiquitous HyperText Transfer Protocol (HTTP) and the equally ubiquitous HyperText Markup Language (HTML). Such references, however, are strictly exemplary and are not intended to limit the mechanisms described to the specific examples provided. Indeed, the techniques described are applicable to any application user interface including, for example, lifestyle and/or entertainment applications, such as audio and/or video presentation applications, video games, virtual reality applications, electronic book readers, and other content consuming and presentation applications.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
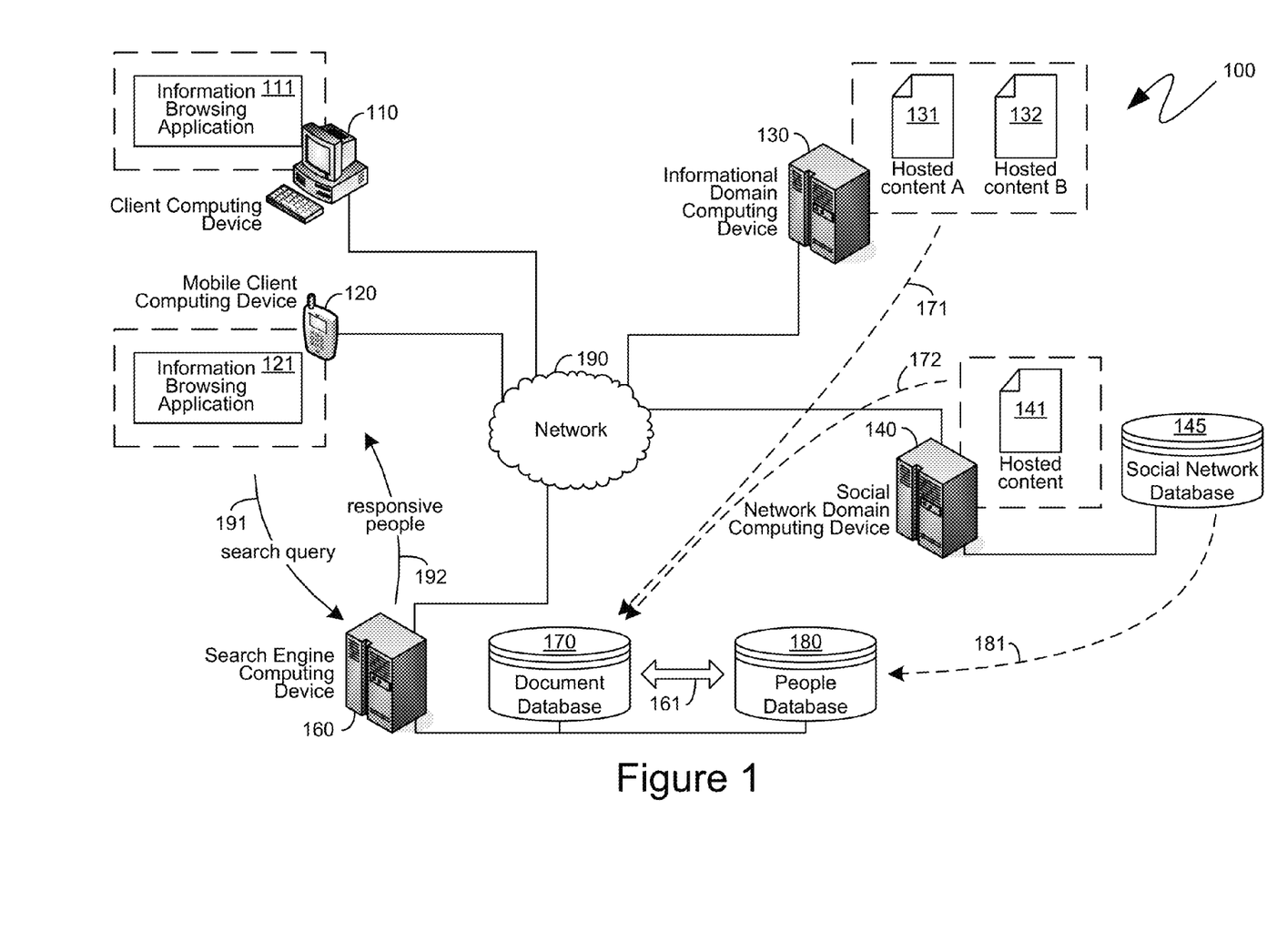
FIG. 1 is a block diagram of an exemplary network of computing devices exchanging communications for identifying individuals responsive to a search query based on their authored content.

Turning to FIG. 1, an exemplary system 100 is shown, which provides context for the descriptions below. The exemplary system 100 of FIG. 1 is shown as comprising a traditional desktop client computing device 110, and a mobile client computing device 120 that are both communicationally coupled to a network 190. The network 190 also has, communicationally coupled to it, a search engine computing device 160 that can provide search functionality to users of client computing devices, such as the client computing device 110 or the mobile client computing device 120. The illustration of the search engine computing device 160 as a single device is strictly for illustrative simplicity, and the descriptions below are equally applicable to processes executing on single search engine computing device 160 or executing across multiple search engine computing devices, either in serial or in parallel.

The search engine computing device 160 can enable users of client computing devices to locate content accessible via the network 190. By way of example, an informational domain computing device 130 and a social network domain computing device 140 are exemplarily shown as being communicationally coupled to the network 190 to provide context for the descriptions below. The informational domain computing device 130 can comprise hosted content 131 and 132. In one embodiment, the informational domain computing device 130 can be a traditional Web server computing device hosting one or more webpages, which typically provide informational content in the form of textual content, image content and other like hypermedia and multimedia content. The social network domain computing device 140 can comprise hosted content 141 that can be dynamically generated based upon information retrieved by the social network domain computing device 140 from the social network database 145 to which it is communicationally coupled. In one embodiment, the social network domain computing device 140 can be a computing device hosting a Web-based social network website through which users exchange textual messages, images, establish business connections, and perform other like social network functionality. In such an embodiment, the hosted content 141 can represent a dynamically generated webpage, such as a webpage on which users can post images or messages and have other users comment and leave feedback.

As will be recognized by those skilled in the art, in order to provide search functionality to users of client computing devices, the search engine computing device 160 can obtain information about the content available via the network 190, such as the content hosted by the informational domain computing device 130 or the content hosted by the social network domain computing device 140. For example, as illustrated by the arrows 171 and 172, the search engine computing device 160 can be communicationally coupled to a document database 170 that can comprise information collected from the hosted content 131 and 132 of the informational domain computing device 130 and the hosted content 141 of the social network domain computing device 140. Since such hosted content is typically divided into units, or "pages", of information, such as the ubiquitous webpage, the database 170 is referred to as a document database even though the information contained therein need not be retained in page format, but rather can be organized in matrices, or other like data structures, to enable efficient searching thereof.

In one embodiment, in addition to the document database 170, the search engine computing device 160 can have access to a people database 180. Such a people database can comprise information about human individuals, including identifying information, such as a name, age, address and the like, and relationship information, such as which individuals are known to one another, are friends of one another, or are otherwise associated with one another. For clarity within the graphical presentation context of FIG. 1, the term "people" is utilized to refer to one or more human individuals and, as such, the terms "people" and "individuals" are used synonymously herein. As will be recognized by those skilled in the art, within the social networking context, the term "friend" is typically utilized to mean any individual with whom a human relationship exists. Consequently, the term "friend" will be utilized in a like manner in the descriptions below. The people database 180 can be generated utilizing a variety of mechanisms. For example, in one embodiment, the people database 180 can be generated by referencing the document database 170, the information of which can be utilized to identify specific human individuals, as well as collect information about those individuals. Such an identification of people, and such a collection of information about such people, from the document database 170, is illustratively represented in FIG. 1 by the arrow 161. In another embodiment, the people database 180 can be generated by collecting information from other databases such as the social network database 145, as illustrated by the arrow 181. For example, the social network database 145 likely already comprises information segmented based on individual people. Such information can be collected directly from the social network database 145 and utilized to populate the people database 180. Additionally, the document database 170 and the people database 180 can augment information collected from one another. For example, people in the people database 180 can be created based on individuals identified in the social network database 145, but then such entities can have additional information associated with them based upon documents, relevant to the individuals of the social network database 145, that are part of the document database 170. In an analogous manner, as another example, entries associated with people in the people database 180 can be created based upon information obtained from the document database 170, and can then have additional information associated with them based upon the information stored in the social network database 145.

Both the client computing device 110 and the mobile client computing device 120 are shown as comprising information browsing applications 111 and 121 to illustrate that the mechanisms described below are equally applicable to mobile computing devices, including laptop computing devices, tablet computing devices, smartphone computing devices, and other like mobile computing devices, as well as to the ubiquitous desktop computing devices. For purposes of the descriptions below, references to the information browsing application 111 executing on the client computing device 110 are intended to be equally applicable to the information browsing application 121 executing on the mobile client computing device 120, and vice versa. In one embodiment, the information browsing application 111, or the information browsing application 121, can be the ubiquitous web browser that can retrieve and display information in the form of websites that are hosted by web servers communicationally coupled to the network 190, such as those described above. However, as indicated previously, the mechanisms described below are not limited to World Wide Web-based environments. Thus, for example, the information browsing applications 111 and 121, can be other types of information browsing applications including, for example, e-book readers, universal document format readers, or even content creation applications, such as word processors, spreadsheets, presentation applications, and e-mail applications. Yet another type of information browsing application can be an operating system itself, including, for example, operating systems comprising support for known networking protocols for the receipt and presentation of information and operating systems comprising information browsing components or built-in or included information browsing applications.

A user of the client computing device, such as the client computing device 110 or the mobile client computing device 120, can utilize the search functionality provided by the search engine computing device 160 by submitting a search query 191 to the search engine computing device 160. As will be recognized by those skilled in the art, such a search query can represent information, typically textual information, although it can include images, audio, and other like multimedia and hypermedia content, about which the user desires to obtain additional information from among the content available via the network 190. In response to the search query 191, in one embodiment, the search engine computing device 160 can provide responsive people 192, either independently of, or together with, other types of search results, such as, for example, traditional document search results that are typically provided in the form of web links to documents in the form of webpages.

Figure 2:
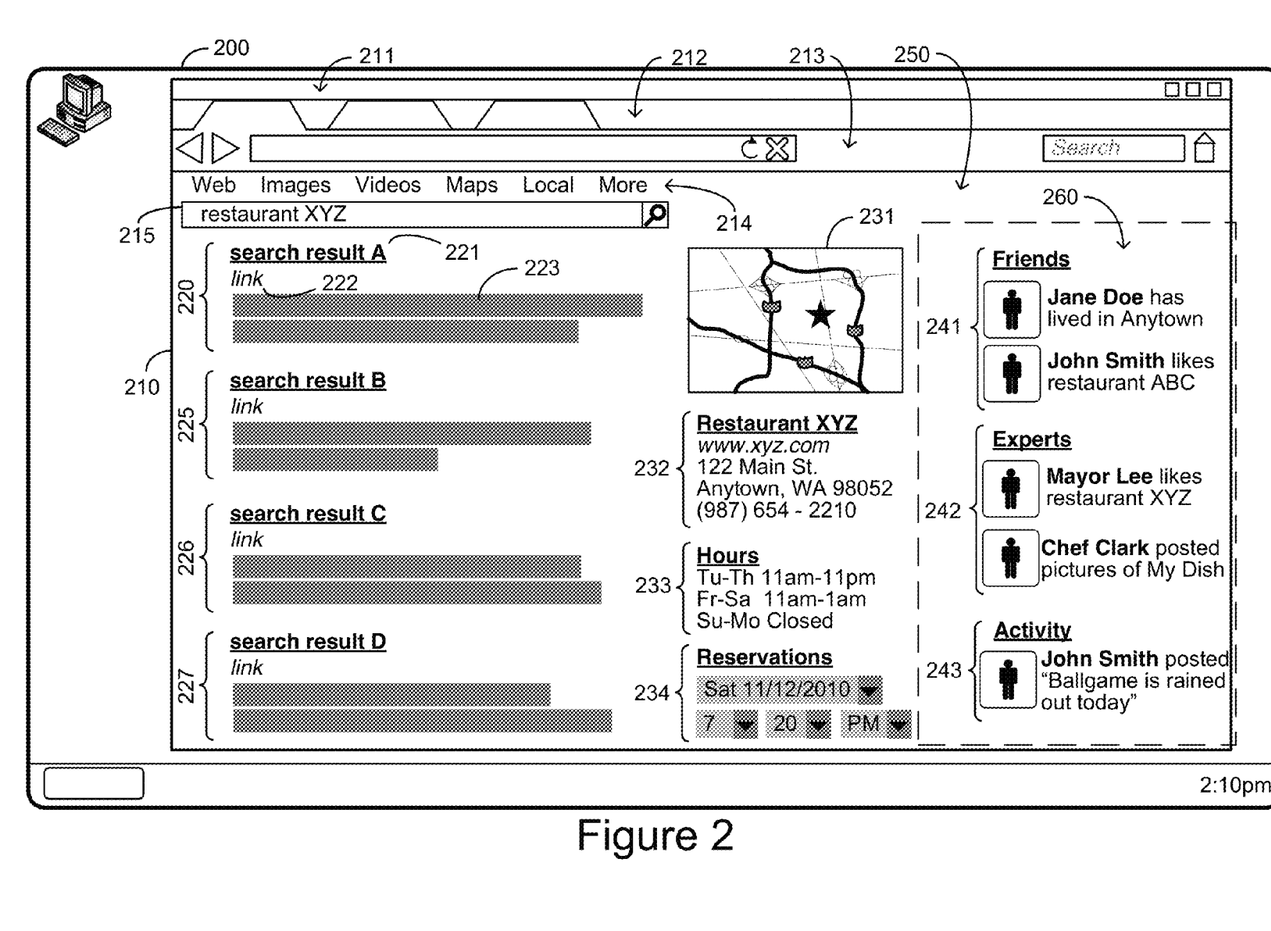
FIG. 2 is a block diagram of an exemplary user interface for identifying individuals responsive to a search query.

Turning to FIG. 2, an exemplary user interface 200 is illustrated to provide context for the descriptions below. The exemplary user interface 200 can comprise a multi-pane presentation of multidimensional search results. Although illustrated within the context of a sort of user interface that would typically be presented by a personal computing device, the descriptions provided below are equally applicable to the sort of user interfaces provided by mobile computing devices. Providing context for the descriptions below, the exemplary user interface 200 of FIG. 2 is shown as comprising a desktop user interface motif within which an application window 210 is presented. The application window 210 can be presented by an information browsing application, such as those described in detail above, which can receive multidimensional search results in response to a user's search query. The application window 210 can comprise a window control area 211 with which the appearance of the window 210 within the user interface 200 can be controlled. Additionally, in one embodiment, the information browsing application can be capable of presenting multiple different sets of content within tabs, and such tabs can be accessed through a tab selection area 212.

User specification of requested content can, in one embodiment, be controlled through a toolbar area 213, which can comprise mechanisms by which users can directly specify content, such as through content resource locators or other like content identifiers, mechanisms by which users can browse through content that was previously viewed, and other like content control mechanisms. The content itself can be displayed in a content presentation area 250 which, in the exemplary user interface 200 as illustrated in FIG. 2, can comprise content received from a search engine that is capable of providing search results comprising, not only the traditional document search results, but also entity search results and people search results. In particular, a search engine can provide links through which users can specify the type of content for which they are searching, an entry mechanism by which users can provide search queries, and, ultimately, search results. Within the context of the exemplary user interface 200 that is shown in FIG. 2, the links provided by the search engine are shown as the links 214 that are displayed in the content presentation area 250 and such links can, exemplarily, allow users to focus their search on images, videos, locations and the like. Similarly, the entry mechanism by which users can provide search queries is shown in exemplary user interface 200 as the search entry area 215, which is also displayed in the content presentation area 250.

To provide a specific exemplary context, a user being presented the exemplary user interface 200 of FIG. 2 can have searched for a particular retail establishment such as, for example, a particular restaurant. Consequently, the search entry area 215 is illustrated as comprising a user search query for a particular restaurant. In response to such query, the search engine can return various types of search results. One type of search results that can be returned can be an identification of documents or pages that reference the restaurant searched for, or are otherwise relevant to, such a restaurant. Thus, as illustrated in the exemplary user interface 200, oriented on the left side of the content presentation area 250, can be a listing of search results 220, 225, 226 and 227. The search results 220, 225, 226 and 227 can be presented any format, though they are illustrated in the exemplary user interface 200 utilizing a common format for providing webpage search results within the context of the ubiquitous World Wide Web. Thus, for example, the search result 200 is shown as comprising an identification 221 of that search result, such as a name or title of the page or document identified, a link 222 to the page or document, and a snippet 223 comprising a small portion of the page or document, typically relevant to the user's search, that can be utilized to provide context for the user to enable the user to quickly determine whether or not the search result 220 is what the user was searching for. The search results 225, 226 and 227 are illustrated comprising similar elements.

Another type of search results that can be returned can comprise entity and task information that can be responsive to the user's search query. For example, in the exemplary user interface 200, where a user is being provided with search results responsive to the user's search query of a particular restaurant, the restaurant the user searched for, as an entity, can be identified and entity information, such as the location of that entity, the name address and contact information for such an entity, and other like entity information, can be presented. Thus, as shown in FIG. 2, a map 231 can indicate the location of the restaurant for which the user searched. Additionally, entity identification information 232 can provide identification of the entity including, for example, the name of the entity, a network domain maintained by the entity, a physical mailing address of the entity, telephone number of the entity, and other like entity identification information. Depending on the type of entity, other entity information can be relevant. Thus, in the exemplary user interface 200, the search engine can have provided, along with the entity identification information 232, entity operating information 233 which can include identification of the dates and times when the restaurant is open. Additionally, certain types of entities may have tasks associated with them. For example, reservation tasks can be associated with restaurant entities, hotel entities, rental car entities and the like. Thus, in the exemplary user interface 200, the search engine can have provided, along with the entity identification information 232 and entity operating information 233, a reservations task 234 by which a user can make a reservation at the restaurant entity that was deemed to be responsive to the user's search query.

Of relevance to the descriptions below, another type of search results that can be returned can comprise people search results that identify human individuals that are deemed to be relevant to the user's search query. Thus, as illustrated by the exemplary user interface 200 of FIG. 2, one or more friends 241 can be identified in response to the user's search query. In the particular example illustrated in FIG. 2, where a user searched for a specific restaurant, the friends 241 that are identified to the user need not necessarily be individuals that the user knows that have eaten at that specific restaurant, but rather can simply be individuals whom the user knows who have a connection to the user's search, such as by living the same town as the searched for restaurant, or have otherwise expressed an interest in food related topics.

As also illustrated by the exemplary user interface 200, one or more experts 242 can also be identified in response to a user's search query. Such experts can, in one embodiment, have particularized knowledge that is relevant to the user's search query. Thus, in the specific example illustrated in FIG. 2, where the user's search query was for a specific restaurant, the experts 242 that can be identified can be individuals that have eaten at that specific restaurant and who have a particularized set of knowledge or experience relevant to restaurants or dining. In another embodiment, experts 242 need not have particularized knowledge relevant to the user's search query, but can simply be individuals considered to have expertise, or some other advanced knowledge, or knowledge not easily obtained, regarding one or more topics to which the user's search query may be relevant. For example, experts 242 need not comprise individuals that have eaten at the specific restaurant for which the user searched, but rather can be individuals who have expertise in restaurants, food preparation, dining, cuisine, and the like, irrespective of their knowledge of the specific restaurant for which the user searched. In yet another embodiment, experts 242 can be individuals whose options, insight or other intellectual product can be valued due to reasons other than their base of knowledge. For example, experts 242 can include celebrities, politicians and other famous people, irrespective of any particularized knowledge they may have regarding the user's search query. As another example, experts 242 can include influential individuals, or individuals who maintain connections with other powerful people, such as business or community leaders. Within the context of the example illustrated in FIG. 2, in such an embodiment, the experts 242 could include a well known politician, or a company president who had either authored content indicating he had eaten at the specific restaurant for which the user searched, or indicating that he liked another restaurant deemed to be related to, or associated with, the restaurant or type of restaurant for which the user searched.

In one embodiment, in addition to an identification of people, search results can also include identification of activities performed by, or associated with, specific individuals that are relevant to the user's search query. Thus, for example, activity 243 can comprise actions performed by, or information posted by, those individuals that were presented as part of the friends 241, the experts 242, or combinations thereof. The activity 243 can, in such an embodiment, provide the user with easy access to the most recent information authored by, or shared by, individuals that were deemed to be relevant to the user's search query.

Figure 4:
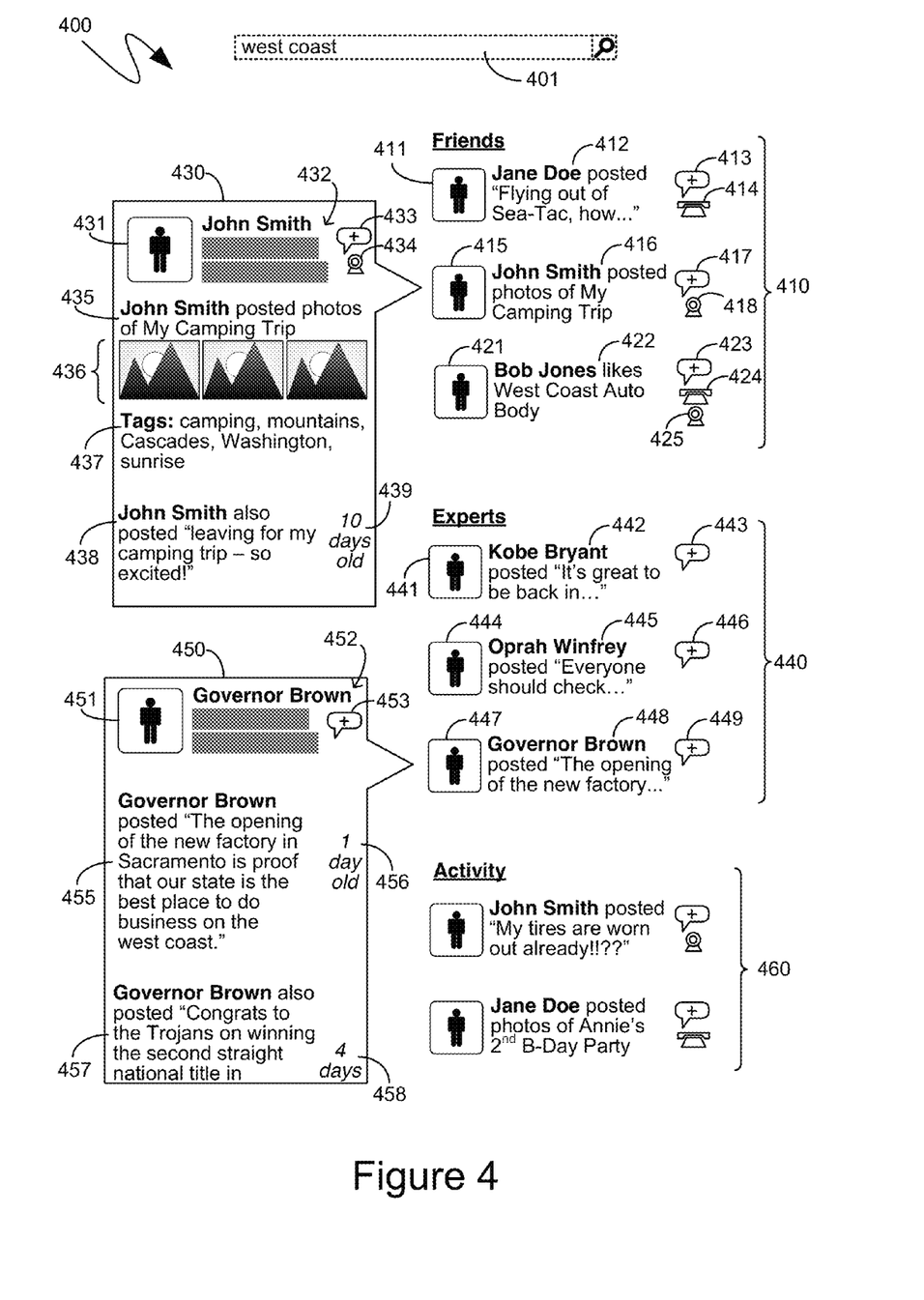
FIG. 4 is a block diagram of an exemplary user interface presenting additional authored information of individuals in response to user action.

The presentation, to a user, of identifications of individuals deemed to be responsive to a user's search, and the presentation of content authored by those individuals, will proceed further below with reference to FIG. 4. FIG. 4 focuses on presentations and mechanisms within the area 260 of the exemplary user interface 200 of FIG. 2, excluding others of the above-described aspects of the exemplary user interface 200 to provide illustrative simplicity. Nevertheless, the presentations and mechanisms described with reference to FIG. 4 are intended to be part of a user interface context, such as the exemplary user interface 200 of FIG. 2, although, as those of skill in the art will appreciate, other exemplary user interface contexts can be equally applicable.

Figure 3:
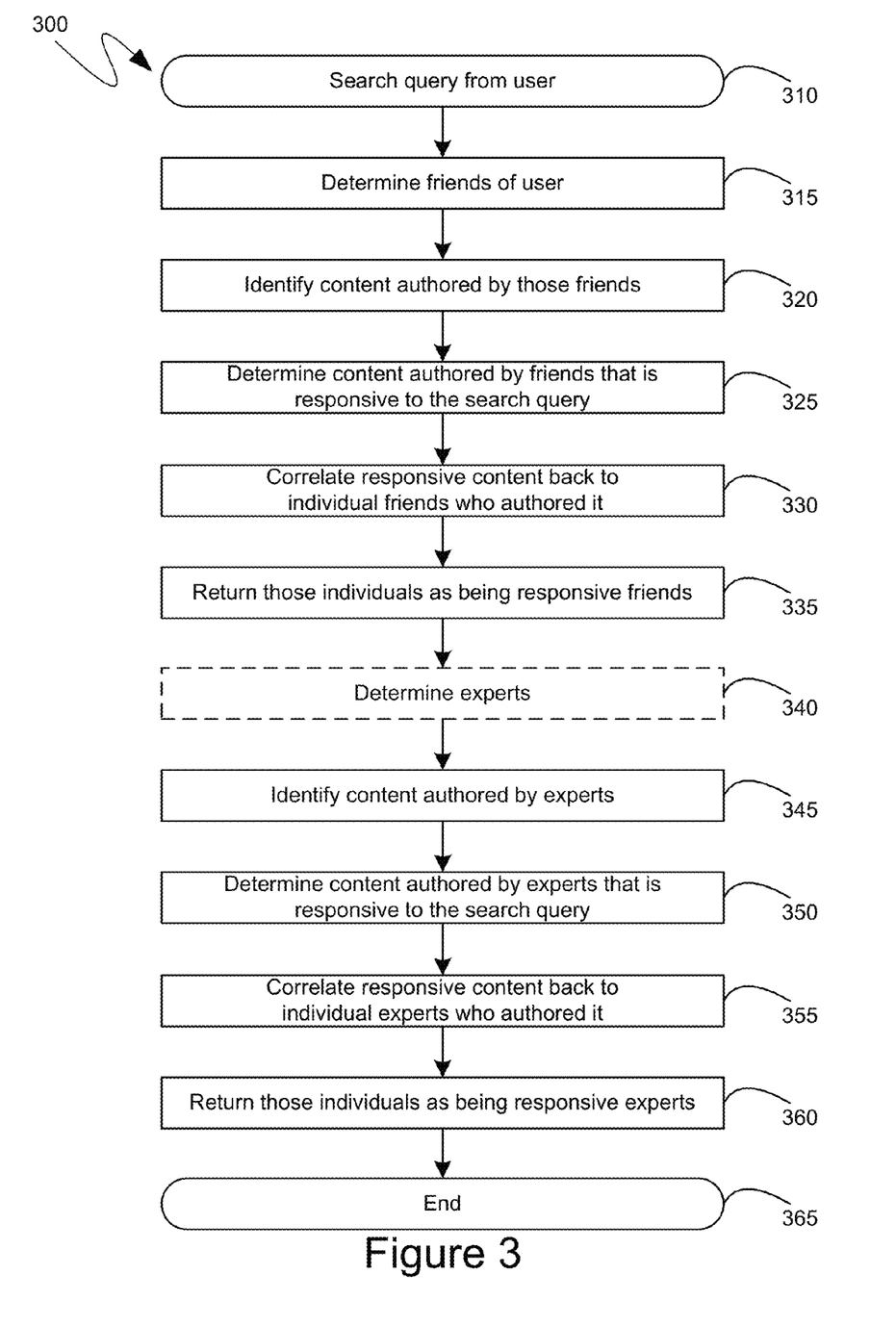
FIG. 3 is a flow diagram of an exemplary operation of computer-executable instructions for identifying individuals responsive to a search query based on their authored content.

Before proceeding with the description of FIG. 4, processing by which individuals can be identified as being responsive to a user's search query is described in greater detail with reference to exemplary flow diagram 300 of FIG. 3. Turning to FIG. 3, as can be seen, at initial step 310 a search query from the user can be received. As indicated previously, such a search query can comprise textual information entered by the user, typically in the form of words or phrases, that represent or identify the topic about which the user wishes to acquire additional information, or which is otherwise relevant to the user's interests. The search query received from the user at step 310, however, need not be limited to textual information and can include, instead, or in addition, graphical data, or other hypermedia and multimedia constructs.

Subsequently, at step 315, individuals who are friends of the user who submitted the search query at step 310 can be determined, such as by reference to the people database described above. As indicated previously, such "friends" can be individuals with whom the user maintains human connection as evidenced by one or more social networking mechanisms including, for example, individuals that the user has explicitly indicated are their friends, individuals with whom the user is linked, connected, or otherwise associated through an explicit association mechanism provided by a social networking domain, individuals to whom the user has directed messages, postings, or other authored content, and other like individuals associated with the user. Once the friends of the user are determined at step 315, content authored by those friends can be identified at step 320. In search terminology, the content identified at step 320, which was authored by the friends determined at step 315, can comprise the "search index", or volume of information, which will be searched to identify content that is responsive to the search query. Subsequently, from among the content identified at step 320, content that is deemed to be responsive to the user's search query can be determined at step 325. In one embodiment, the determination of responsive content, at step 325, can be dependent upon the quantity of individuals determined to be friends of the user at step 315 and upon the quantity of content authored by those individuals, as identified at step 320. For example, if a user has a large quantity of friends, and if those friends have authored a large quantity of content, then it can be likely that, at step 325, there exists content that is highly relevant to the user's search query. As will be recognized by those skilled in the art, such a situation can correspond to a voluminous search index. By contrast, if a user does not have a lot of friends, or if the user's friends do not author a large quantity of content, then it can be more difficult, at step 325, to find content that is highly relevant to the user's search query. Again, in the parlance of those skilled in the art, such a situation can correspond to a sparse search index. In such a latter situation, the threshold of relevance can be reduced so that at least some content authored by user's friends can be deemed to be responsive, at step 325. Such a dynamic threshold of relevance, can enable responsive contents to be determined, at step 325, irrespective of the quantity of content to be searched which, as indicated previously, is dependent upon the quantity of friends of the user and the quantity of content authored by those friends. In another embodiment, rather than applying a dynamic threshold of relevance, step 325 can apply a static threshold of relevance such that, for users with a lot of friends, or whose friends author a lot of content, a greater amount of content will be found to be responsive, at step 325, then for users who do not have a lot of friends, or whose friends do not author much content.

Once the content that is authored by user's friends, and which is responsive to the search query, is determined at step 325, processing can proceed to step 330 where the individual friends who authored such content can be identified by correlating the responsive content back to its authors. The individuals identified at step 330 can then be identified, at step 335, as being responsive to the user's query.

In addition to determining friends that may be responsive to a user's query, a further determination can identify "experts" who also may be responsive to the user's query. As utilized herein, the term "experts" means those individuals having particularized knowledge in one or more defined subject areas, having influence over other individuals, or having unique experiences or circumstances based upon their popularity, renown, positions of power, or other like public lifestyles. Thus, "experts" can include researchers or professors in a given field or subject area, which can be associated with the user's search query. Alternatively, or in addition, "experts" can include politicians, celebrities, or other individuals who are well known. Alternatively, or in addition, "experts" can also include influential individuals, such as business or community leaders. Consequently, an optional step 340 can be performed wherein relevant experts can be determined. The step 340 can be optional because certain types of experts, such as politicians, celebrities, or other individuals who are well known, and such as business leaders or other individuals who are influential, can be independent of the user's search query and, consequently, need not be separately determined for each query. By contrast, experts in the sense of researchers or professors in a given field or subject area can be dependent upon the search query that was received at step 310. To identify such experts, step 340 can be performed based on the search query received at step 310. In either case, however, one difference that can exist between "experts" and "friends", as those terms have been defined herein, can be that friends are dependent upon the user that is performing the search, and are specific to that user, while experts can be user-agnostic.

Subsequently, at step 345, an identification can be made of the content that was authored by experts, whether they are experts who were determined, such as at step 340, specifically in light of the query received at step 310, or whether they are experts who are well known or influential and, consequently, need not be specific to the search query. At step 350, content authored by those experts that is responsive to the search query can be determined. In one embodiment, as indicated previously, a threshold relevance level for the determination of content that is to be deemed responsive can be dynamically adjusted such that, if the content identified at step 345 comprises a smaller selection of content and, as such, represents a smaller search index, then the threshold relevance level can be reduced, while, if the content identified at step 345 comprises a large selection of content, and, as such, represents a larger search index, then the threshold relevance level can be increased. In another embodiment, however, as also indicated previously, the threshold relevance level can be maintained irrespective of the size of the search index of expert-authored content. Additionally, in one embodiment, the threshold relevance level applied to expert-authored content can be independent of the threshold relevance level applied to friend-authored content, and each can be either static or dynamic independently of the other.

Once responsive content, authored by experts, is determined at step 350, it can be correlated back to the individual experts that authored it at step 355. Subsequently, at step 360, those individuals can be identified as experts that are responsive to the search query that was received at step 310. The relevant processing can then end at step 365. Although not specifically illustrated in the flow diagram 300 of FIG. 3, additional post-processing can be performed, such as by identifying experts that may have been improperly deemed to be responsive experts at step 360. For example, a celebrity may be well known to be agnostic as to one or more topics. In such a situation, even if content authored by such a celebrity is found to be responsive to the search query, such as at step 350, such a celebrity may not be returned as a responsive expert at step 360 due to post-processing, thereby aligning the individuals identified at step 360 with the user's expectations. As one specific example, a celebrity artist may be known to dislike football and, while such an individual may have authored content that may be deemed to be relevant to a query directed to football, a user would not likely perceive such a celebrity, with a well-known dislike of football, to be an appropriate source of responsive content. Consequently, in such an example, post-processing can be applied to prevent such a celebrity from being identified to the user.

Additionally, while indicated in a linear fashion, those of skill in the art will recognize that certain ones of the steps of the flow diagram 300, illustrated in FIG. 3, can be performed independently and, as such, can be performed in parallel, or prior to, or after, their order as illustrated in FIG. 3. For example, steps 315 through 335 can be performed in parallel with steps 340 through 360. Other like alternative order of execution will be recognized by those skilled in the art and are equally encompassed by the mechanisms described herein.

Turning to FIG. 4, a portion 400 of an exemplary user interface is shown, such as, in one example, the exemplary user interface 200 illustrated in FIG. 2. The portion 400 of the exemplary user interface can comprise a presentation of friends 410 that can be provided in response to a user search query 401, a presentation of experts 440 also provided in response to the user search query 401, and activity 460 representing recently authored content by those individuals identified as the responsive friends 410. In one embodiment, an individual can be identified by a picture, information content, contact mechanisms through which such an individual can be contacted, and other like information. For example, the individual "Jane Doe" can be identified via a photograph or image 411, information content 412, and contact mechanisms, such as the messaging contact 413 or the telephonic contact 414. The images presented with the identification of individuals can be images that are associated with those individuals, such as, for example, images that those individuals have chosen to represent them in one or more social networking contexts. Thus, for example, the image 411 can be an image selected by the individual "Jane Doe" to represent her within one or more social networking contexts. Alternatively, the image 411 can be an image selected by the user performing the search, which such a user can have assigned to the individual "Jane Doe" to lead the user in recognizing her. Contact mechanisms can also be based on information provided by such individuals in social networking contexts, or information provided by the user, such as information that can be collected from a local contacts database. For example, the messaging contact 413 can enable a user to send a message to the individual "Jane Doe", including messages, posts and comments sent through social networking contexts. Similarly, the telephonic contact 414 can enable a user to call the individual "Jane Doe", such as at a telephone number provided by such an individual in one or more social networking contexts. The telephonic contact 414 can be particularly useful if the user interface is being presented by a computing device having telephonic capabilities, such as the ubiquitous smartphone.

The informational content 412 that can be provided as part of the identification of an individual deemed to be responsive to a search query can identify the individual, such as by providing their proper name, and can provide an indication of the content authored by such individual that can have been deemed relevant to, or responsive to, the search query 401. The indication of the content can include an identification of the nature of the content, such as whether it was posted, messaged, or the like, or whether it is content that was simply commented upon, such as by being "liked" or otherwise positively or negatively reacted to by the individual. The indication of the content can also include a portion of the content, or other metadata about the content, such as a title of the content.

Thus, the portion 400 of an exemplary user interface that is illustrated in FIG. 4 can include identifications of multiple friends 410 and multiple experts 440, with each identification comprising at least some of the above-described elements. For example, the identification of the friend named "John Smith" as being someone who is responsive to the user's search query 401 can comprise an image 415, informational content 416, a messaging contact 417 and a video chat contact 418. Similarly, the identification of the friend named "Bob Jones" can comprise an image 421, informational content 422, a messaging contact 423, a telephonic contact 424 and a video chat contact 425. As can be seen, different individuals can be indicated with different contact mechanisms, which can depend upon the sorts of contact mechanisms made available by those individuals, or which can be available specifically to the user performing the search. Additionally, as can also be seen, different sorts of content can have been authored by the friends 410 that can have been deemed responsive to the search query 401. For example, as indicated by the informational content 412, a posting regarding the SeaTac airport can have been authored by the individual "Jane Doe" and can have been deemed to have been responsive to the search query 401. Similarly, as another example, as indicated by the informational content 416, photographs can have been "authored" by the individual "John Smith" and those photos can have been deemed to have been responsive to the search query 401. As yet another example, as indicated by the informational content 422, an approval of a particular entity can be content that can have been authored by the individual "Bob Jones", and such an entity can have been deemed to have been responsive to the search query 401.

In one embodiment, user action directed to one of the identified friends 410 can provide additional information, and in particular the content authored by such an individual, to enable the user to more accurately determine why such an individual was identified as being responsive to the user's search query 401, and to further determine whether such an individual is relevant to the user's interests in performing the search. For example, user action directed to the identification of the individual "John Smith" can result in the presentation of an additional user interface element 430. Such user action can be in the form of a "hover" action, whereby the user can position a cursor, or other user selection device, proximate to the identification of the individual "John Smith". Other user actions can include a "click", or other like action performed via a user interface hardware device, a "touch", or other like action performed by the user on a touch-sensitive surface, and other like user actions.

As illustrated by the portion 400 of the exemplary user interface that is illustrated in FIG. 4, the user interface element 430 can comprise an image 431, which can be the same as the image 415, or can be another image that can aid the user in identifying the individual "John Smith", and can comprise identification information 432 such as, for example, the individual's name and other metadata including, for example, an identification of one or more social networking constructs maintained by, or associated with, the individual. The user interface element 430 can also comprise the content 436 that was authored by the individual and is the reason why such an individual is identified as a responsive individual to the user's search query 401. In the particular example illustrated in FIG. 4, the authored content 436 can comprise photographic content. Authored content can also comprise textual content and any other hypermedia or multimedia content. By providing access to such authored content without requiring the user to leave a current user interface context such as, for example, the search user interface context, the user can more efficiently identify the reasons why an individual was presented to the user as an individual that was deemed to be responsive to the user's search query. In addition to the content itself, such as the photographic content 436, the user interface element 430 can also comprise content metadata. For example, a description 435 can provide information including, for example, a title of the content, the author of the content, the nature of the content, and other like metadata. Similarly, tags 437 can identify topics, entities, individuals, and other like elements that are relevant to, or associated with, the content 436.

In one embodiment, there may exist multiple discrete content that can be authored by an individual, each of which can, individually, be deemed responsive to the user's search query 401. In such an embodiment, the user interface element 430 can present such additional authored content such as, for example, the authored content 438 which can be presented with metadata 439 including, for example, an age of the authored content. To the extent that the content sought to be presented by the user interface element 430 can exceed the visual space allotted to the user interface element 430, known user interface mechanisms, such as scrolling, panning and zooming can be utilized to present such additional content.

The quantity of content authored by an individual can be one factor in determining the order in which such an individual is identified to the user as among, for example, the friends 410. For example, an individual who authored a greater amount of content that is deemed to be relevant to the user's search query can be presented more prominently than an individual who authored a lesser amount of content that is deemed to be relevant. The prominence of the presentation of individuals can be in a traditional manner, with the identifications of individuals positioned near the top of the visual presentation being more prominent than those appearing below. In addition to the quantity of relevant content authored by an individual, the percentage of relevant content authored by such individual can also be a factor in determining the order in which such an individual is identified to the user. For example, if two individuals each authored a single piece of content that is deemed to be relevant to the user search query, but one individual has otherwise authored a great deal of content, while the other individual has only authored the one element of content that was deemed to be relevant, that latter individual can be identified more prominently than the former individual.

Another factor in determining such an order can be the closeness of the relationship between the user and the individual. In particular, as will be recognized by those skilled in the art, social networks can maintain information regarding the degrees of separation between two or more individuals, and such information can be utilized in determining the order in which responsive individuals are presented to the user. For example, given two individuals whose authored content is equally responsive to the user's search query, the individual having the closer relationship to the user, or having fewer degrees of separation between them and the user, can be presented more prominently then the other individual, such as by being visual arranged above the presentation of such other individual.

In one embodiment, as indicated previously, in addition to the friends 410 one or more experts 440 can also be identified as being responsive to the user's search query 401. Like the friends 410, identifications of the experts 440 can comprise images, such as the images 441, 444 and 447, informational content, such as the informational content 442, 445 and 448, and contact mechanisms such as the messaging contacts 443, 446 and 449. Should user action be directed to one of the identifications of the experts 440 a user interface element 450, analogous to the user interface element 430, can be presented in response to such a user action. The user interface element 450 can comprise image 451 and other identification information 452, as well as a messaging contact 453, which can be analogous to the image 431, identification information 432 and messaging contact 433 described above. In the specific example illustrated in FIG. 4, the user interface element 450 can comprise authored content 455, which can have an age 456 associated with it and displayed with it within the user interface element 450. User interface element 450 can also comprise authored content 457, which can also have an age 458 associated with it.

In addition to the factors referenced above, another factor that can impact the order in which individuals are identified to a user can be the age of the content authored by such individuals that is deemed to be responsive to the user's search query 401. For example, more recent content can be deemed to be more important, or result in a higher ranking, than older content. Similarly, in the presentation of such content, such as, for example, within a user interface element such as the user interface element 450, newer content, such as the content 455, can be presented ahead of older content, such as the content 457.

In addition to the friends 410 and experts 440, recently authored content can be presented as part of the activity 460. In one embodiment, the recently authored content presented as part of the activity 460 can be the content authored only by those individuals identified as part of the friends 410. In another embodiment, the activity 460 can include content authored by the experts 440, or combinations of the experts 440 and the friends 410. Additionally, identifications of individuals and portions of the authored content as part of the activity 460 can, likewise, result in the presentation of user interface elements, such as the user interface elements 430 and 450, should user action be directed accordingly.

Figure 5:
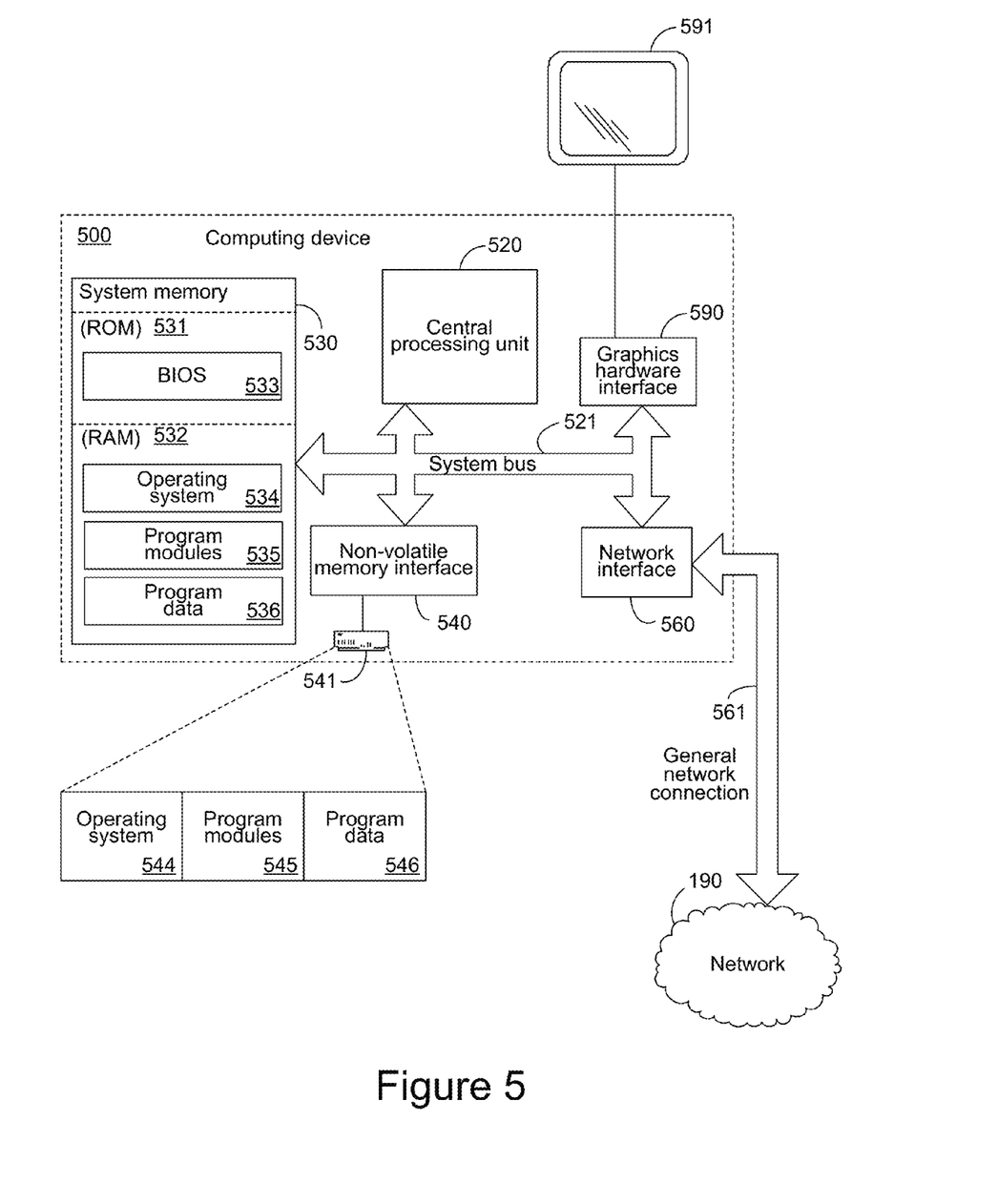
FIG. 5 is a block diagram of an exemplary computing device.

Turning to FIG. 5, an exemplary computing device 500 is illustrated. The exemplary computing device 500 can be any one or more of the computing devices illustrated in FIG. 1, whose operations were described in detail above. The exemplary computing device 500 of FIG. 5 can include, but is not limited to, one or more central processing units (CPUs) 520, a system memory 530, that can include RAM 532, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, such as for the display of visual user interfaces, including, but not limited to, a graphics hardware interface 590 and a display device 591, which can include display devices capable of receiving touch-based user input, such as a touch-sensitive, or multi-touch capable, display device. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and the aforementioned RAM 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates the operating system 534 along with other program modules 535, and program data 536.

The computing device 500 may also include other removable/non-removable, volatile/nonvolatile computer storage media. By way of example only, FIG. 5 illustrates the hard disk drive 541 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 can operate in a networked environment using logical connections to one or more remote computers. The computing device 500 is illustrated as being connected to the general network connection 561 through a network interface or adapter 560, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

As can be seen from the above descriptions, mechanisms and user interfaces have been enumerated for presenting individuals and their authored content that is responsive to a search query to a user performing the search. In view of the many possible variations of the subject matter described herein, we claim as our invention all such embodiments as may come within the scope of the following claims and equivalents thereto.

We claim:

1. A graphical user interface, generated on a display device by a computing device, providing identifications of individuals responsive to a user's search query, the user interface comprising:
   one or more search results identifying documents that are deemed to be responsive to the user's search query and that are hosted by an informational domain that is external to, and independent of, a social network domain comprising social networking data of the user;
   an identification of a first individual responsive to the user's search query, the identification comprising an image associated with the first individual and an indication of a first content, authored by the first individual, which was deemed to be responsive to the user's search query;
   a user interface element proximate to the identification of the first individual, the user interface element comprising at least a portion of the first content, the portion being responsive to the user's search query, the at least the portion of the first content differing from the indication of the first content, the user interface element being presented in response to user action directed to the identification of the first individual; and
   an identification of a second individual responsive to the user's search query, the identification of the second individual comprising an image associated with the second individual and an indication of a second content, authored by the second individual, which was deemed to be responsive to the user's search query;
   wherein one of the first individual or the second individual shares a human connection with the user, as indicated by the social networking data of the user while the other of the first individual or the second individual was selected based on their fame and does not share the human connection with the user as indicated by the social networking data of the user.

2. The graphical user interface of claim 1, wherein user action is a hover action.

3. The graphical user interface of claim 1, wherein the first content authored by the first individual which was deemed to be responsive to the user's search query comprises at least a first portion and a second portion authored independently of the first portion; and wherein further a one of the first portion or the second portion that was authored more recently is presented, within the user interface element, more prominently than an other of the first portion or the second portion that was authored less recently.

4. The graphical user interface of claim 1, wherein the first content authored by the first individual which was deemed to be responsive to the user's search query comprises an identification of an entity that the first individual has indicated an approval of in a social networking context.

5. The graphical user interface of claim 1, wherein the user interface element further comprises metadata providing information about the first content authored by the first individual which was deemed to be responsive to the user's search query.

6. The graphical user interface of claim 1, wherein the identification of the first individual responsive to the user's search query was obtained by performing steps comprising:
determining a first set of individuals sharing a human connection with the user as indicated by social networking data of the user;
identifying a first set of content authored by the first set of individuals;
determining, from among the first set of content, a first set of responsive content that is responsive to the user's search query;
correlating content from the first set of responsive content to one or more individuals, from among the first set of individuals, who authored such content;
identifying, as the first individual responsive to the user's search query an individual, from among the first set of individuals who authored content from the first set of responsive content; and
wherein further the identification of the second individual responsive to the user's search query was obtained by performing steps comprising:
determining a second set of individuals based on an individual's fame, wherein individuals in the determined second set of individuals do not share the human connection with the user as indicated by social networking data of the user;
identifying a second set of content authored by the second set of individuals;
determining, from among the second set of content, a second set of responsive content that is responsive to the user's search query;
correlating content from the second set of responsive content to one or more individuals, from among the second set of individuals, who authored such content; and
identifying, as the second individual responsive to the user's search query, an individual from among the second set of individuals who authored content from the second set of responsive content.

7. A computing device comprising:
one or more processing units; and
one or more computer-readable storage media comprising computer-executable instructions, which, when executed by the one or more processing units, cause the computing device to:
determine a first set of individuals sharing a human connection with the user as indicated by social networking data of the user;
identify a first set of content authored by the first set of individuals;
determine, from among the first set of content, a first set of responsive content that is responsive to the user's search query;
correlate content from the first set of responsive content to one or more individuals, from among the first set of individuals, who authored such content;
identify, as the individuals responsive to the user's search query, the one or more individuals, from among the first set of individuals, who authored content from the first set of responsive content; and
determine a second set of individuals based on either an individual's knowledge or on an individual's fame, wherein individuals in the determined second set of individuals do not share the human connection with the user as indicated by social networking data of the user;
identify a second set of content authored by the second set of individuals;
determine, from among the second set of content, a second set of responsive content that is responsive to the user's search query;
correlate content from the second set of responsive content to one or more individuals, from among the second set of individuals, who authored such content; and
identify, as the individuals responsive to the user's search query, the one or more individuals, from among the second set of individuals, who authored content from the second set of responsive content.

8. The computing device of claim 7, wherein the computer-executable instructions for determining the second set of individuals comprise computer-executable instructions for determining the second set of individuals based on a topic of the user's search query.

9. The computing device of claim 7, wherein the one or more computer-readable storage media comprise further computer-executable instructions, which, when executed by the one or more processing units, cause the computing device to: perform post-processing preventing identification, as the individuals responsive to the user's search query, individuals from among the second set of individuals who are perceived to be agnostic as to a topic of the user's search query.

10. The computing device of claim 7, wherein the one or more computer-readable storage media comprise further computer-executable instructions, which, when executed by the one or more processing units, cause the computing device to: dynamically adjust a first threshold relevance level based on a quantity of content in the first set of content; and
wherein the computer-executable instructions for determining the first set of responsive content comprise computer-executable instructions for determining the first set of responsive content in accordance with the dynamically adjusted first threshold relevance level.

11. The computing device of claim 7, wherein the one or more computer-readable storage media comprise further computer-executable instructions, which, when executed by the one or more processing units, cause the computing device to: rank the identified individuals responsive to the user's search query based on one or more of: a quantity of content, from among the first set of responsive content, authored by one of the identified individuals, a proportion of content, from among content authored by one of the identified individuals, that is in the first set of responsive content, and a timeliness of content authored by one of the identified individuals that is in the first set of responsive content.

12. The computing device of claim 7, wherein the one or more computer-readable storage media comprise further computer-executable instructions, which, when executed by the one or more processing units, cause the computing device to: provide, with each identification of one of the individuals responsive to the user's search query, content, from the first set of responsive content, that was authored by the identified one of the individuals.

13. The computing device of claim 10, wherein the one or more computer-readable storage media comprise further computer-executable instructions, which, when executed by the one or more processing units, cause the computing device to: dynamically adjust a second threshold relevance level, independently of the first threshold level, based on a quantity of content in the second set of content; and wherein the computer-executable instructions for determining the second set of responsive content comprise computer-executable instructions, which, when executed by the one or more processing units, cause the computing device to determine the second set of responsive content in accordance with the dynamically adjusted second threshold relevance level.

14. A method of identifying individuals responsive to a user's search query, the method comprising the steps of:
   determining a first set of individuals sharing a human connection with the user as indicated by social networking data of the user;
   identifying a first set of content authored by the first set of individuals;
   determining, from among the first set of content, a first set of responsive content that is responsive to the user's search query;
   correlating content from the first set of responsive content to one or more individuals, from among the first set of individuals, who authored such content;
   identifying, as the individuals responsive to the user's search query, the one or more individuals, from among the first set of individuals, who authored content from the first set of responsive content; and
   determining a second set of individuals based on either an individual's knowledge or on an individual's fame, wherein individuals in the determined second set of individuals do not share the human connection with the user as indicated by social networking data of the user;
   identifying a second set of content authored by the second set of individuals;
   determining, from among the second set of content, a second set of responsive content that is responsive to the user's search query;
   correlating content from the second set of responsive content to one or more individuals, from among the second set of individuals, who authored such content; and
   identifying, as the individuals responsive to the user's search query, the one or more individuals, from among the second set of individuals, who authored content from the second set of responsive content.

15. The method of claim 14, wherein the determining the second set of individuals comprises determining the second set of individuals based on a topic of the user's search query.

16. The method of claim 14, further comprising performing post-processing preventing identification, as the individuals responsive to the user's search query, individuals from among the second set of individuals who are perceived to be agnostic as to a topic of the user's search query.

17. The method of claim 14, further comprising dynamically adjusting a first threshold relevance level based on a quantity of content in the first set of content; wherein the determining the first set of responsive content comprises determining the first set of responsive content in accordance with the dynamically adjusted first threshold relevance level.

18. The method of claim 17, further comprising dynamically adjusting a second threshold relevance level, independently of the first threshold level, based on a quantity of content in the second set of content; wherein the determining the second set of responsive content comprises determining the second set of responsive content in accordance with the dynamically adjusted second threshold relevance level.

19. The method of claim 14, further comprising ranking the identified individuals responsive to the user's search query based on one or more of: a quantity of content, from among the first set of responsive content, authored by one of the identified individuals, a proportion of content, from among content authored by one of the identified individuals, that is in the first set of responsive content, and a timeliness of content authored by one of the identified individuals that is in the first set of responsive content.

20. The method of claim 14, further comprising providing, with each identification of one of the individuals responsive to the user's search query, content, from the first set of responsive content, that was authored by the identified one of the individuals.

* * * * *